United States Patent [19]

Buehler

[11] Patent Number: 4,526,883
[45] Date of Patent: * Jul. 2, 1985

[54] OLEFIN POLYMERIZATION CATALYST ACTIVITY BY SIMULTANEOUS OLEFIN WASHING AND ADDITION OF ELECTRON DONOR

[75] Inventor: Charles K. Buehler, Naperville, Ill.

[73] Assignee: Northern Petrochemical Company, Omaha, Nebr.

[ * ] Notice: The portion of the term of this patent subsequent to Sep. 11, 2001 has been disclaimed.

[21] Appl. No.: 622,471

[22] Filed: Jun. 20, 1984

[51] Int. Cl.$^3$ .............................................. C08F 4/64
[52] U.S. Cl. ...................................... 502/108; 502/127
[58] Field of Search ....................... 502/108, 127, 105

[56] References Cited

U.S. PATENT DOCUMENTS

| T951,009 | 10/1976 | Haggard | 502/105 |
|---|---|---|---|
| 3,046,266 | 7/1962 | Benning et al. | 526/90 |
| 3,062,801 | 11/1962 | Hoeg et al. | 502/108 X |
| 3,404,096 | 10/1968 | Lamborn | 502/108 X |
| 4,048,415 | 9/1977 | Matsuzawa et al. | 502/127 X |
| 4,242,480 | 12/1980 | Welch | 502/127 X |
| 4,312,784 | 1/1982 | Welch | 502/127 X |
| 4,343,721 | 8/1982 | Goodall et al. | 502/127 X |
| 4,471,064 | 9/1984 | Buehler | 502/108 |
| 4,471,065 | 9/1984 | Buehler | 502/108 |

*Primary Examiner*—Patrick P. Garvin
*Attorney, Agent, or Firm*—Donald F. Haas

[57] ABSTRACT

A method is disclosed for increasing the productivity of an olefin polymerization catalyst. The catalyst contains an aluminum chloride co-crystallized titanium halide. The catalyst component is simultaneously washed with an olefin and electron donor is added to the catalyst component, thereby greatly increasing its productivity without significantly adversely affecting the crystallinity of the polymer produced.

6 Claims, No Drawings

OLEFIN POLYMERIZATION CATALYST ACTIVITY BY SIMULTANEOUS OLEFIN WASHING AND ADDITION OF ELECTRON DONOR

BACKGROUND OF THE INVENTION

This invention relates to a method for increasing the productivity of olefin polymerization catalysts and to the production of such a catalyst which exhibits better productivity and produces a polymer with acceptable stereospecificity. More particularly, the invention relates to an improved method for washing an aluminum chloride co-crystallized titanium halide and adding an electron donor to increase the productivity of the catalyst.

U.S. Pat. No. 4,048,415, issued Sept. 13, 1977, discloses an improved process for the polymerization of olefins with a catalyst which has a titanium tetrachloride component prepared by reduction of titanium tetrachloride with hydrogen, silicon, metallic titanium or metallic aluminum, a complex of aluminum chloride with an electron donor, and a polysiloxane, and extracting the complex from the catalyst with a saturated hydrocarbon. The patentee desires to remove the complex, aluminum chloride, and electron donor which the patentee states are detrimental to the polymerization. I have found that better catalyst productivity can be obtained without sacrificing stereospecificity if the catalyst is washed with an olefin rather than a saturated hydrocarbon. Furthermore, addition of the electron donor improves the productivity of the catalyst.

U.S. Pat. No. 3,404,096, issued Oct. 1, 1968, discloses a method for improving a titanium trichloride catalyst by pretreating the catalyst in an inert diluent in the absence of an activator with an olefin having 2 to 6 carbon atoms for a minimum of about 10 minutes. It is said that the catalyst undergoes a physical change whereby it agglomerates into curds and appears to swell. Defensive Publication T951,009, published Oct. 5, 1976, discloses an olefin polymerization catalyst which comprises titanium trichloride ground together with octamethylpyrophosphoramide wherein the two components are ground together in a ball mill and then contacted with propylene for a time sufficient for from 0.1 up to 5.0 moles of propylene to be taken up by the titanium compound. Both of the above catalysts are different from the catalyst of the present invention in that they both appear to react with the olefin such that material is added to the catalyst and there is no addition of electron donor with the olefin treatment.

My co-pending application entitled Improved Olefin Polymerization Catalyst Activity by Olefin Washing and Readdition of Electron Donor, Ser. No. 530,497, filed Sept. 9, 1983 and now Pat. No. 4,471,064, discloses a method for increasing the productivity of an olefin polymerization catalyst containing an aluminum chloride co-crystallized titanium halide modified with an electron donor containing an ester group which comprises washing the modified titanium halide with an olefin and then adding back electron donor thereto. Thus, it is a two-step process. Surprisingly, I have found that many of the advantages of the above process can be obtained if the olefin washing and the adding of electron donor are carried out simultaneously. Even though it would seem that the two steps would interfere with one another, a polymerization catalyst with improved productivity can be obtained without the necessity of expensive and time consuming milling of the catalyst with the electron donor.

SUMMARY OF THE INVENTION

The present invention is a method for increasing the productivity of an olefin polymerization catalyst containing an aluminum chloride co-crystallized titanium halide which comprises simultaneously washing the titanium halide with an olefin and adding electron donor thereto. In a preferred embodiment of the invention, the electron donor is an organic acid ester such as a benzoic acid ester, ethyl phenyl acetate, or a halogenated carboxylic acid ester. It is preferred that the treatment take place for a period of at least about one minute. It is preferred that from about 0.1 to about 2 grams of the electron donor per gram of catalyst be added to the washed catalyst.

DETAILED DESCRIPTION OF THE INVENTION

The catalyst produced by the process of the present invention can be used to polymerize or copolymerize one or more alpha olefin monomers such as ethylene, propylene, 1-butene, 3-methyl-1-butene, 1-pentene, 4-methyl-1-pentene, 1-hexene, styrene, 1-octene, dodecene, and tetradecene. The catalyst component treated according to my process comprises an aluminum chloride co-crystallized titanium halide.

The titanium halide co-crystals which are particularly suitable are obtained by co-crystallizing titanium trichloride with aluminum trichloride. Co-crystals of the formula $TiCl_3 \cdot \frac{1}{3}AlCl_3$ are particularly suitable. Titanium trichloride can be obtained by reducing titanium tetrachloride with hydrogen, aluminum or an aluminum-organic compound. The appropriate titanium halides are commercially available and hence do not require further comment.

The electron donor can be selected from a wide variety of organic compounds which have an ester group. These include, but are not limited to, alkyl esters of aliphatic monocarboxylic acids, alkyl esters of aromatic monocarboxylic acids, and alkyl esters of saturated and unsaturated aliphatic and aromatic acids. Particularly preferred for use in the present invention are the alkyl esters of organic acids, especially, monocarboxylic acid esters such as benzoic acids esters including ethyl, butyl, and benzyl benzoate, ethyl phenyl acetate, and halogenated carboxylic acid esters such as ethyl 4-chlorobutyrate.

The olefin which is used in the wash procedure of the present invention may be any primary or secondary olefin which is not a solid at the washing temperature and, if a gas, is soluble in normal hydrocarbons. Ethylene, propylene, 1-butene, 3-methyl-1-butene, 1-pentene, 4-methyl-1-pentene, 1-hexene, styrene, allyl benzene, dimethyl butene, dodecene, tetra- decene, mixtures of dodecene and tetradecene, cyclohexene and dimethylbutene can all be used to advantage in the present invention.

It is necessary that the olefin and the electron donor come into contact with the catalyst component in a liquid medium. The olefin itself can be used in pure liquid form if the electron donor is soluble in the olefin or the olefin and the electron donor can be dissolved in a solvent such as heptane. In the latter case, the catalyst component would then be treated with the olefin-electron donor-solvent solution. It is preferable that the treatment take place for a period of at least about one minute because it appears that complexes of electron donor-aluminum chloride and aluminum chloride-olefin are formed and one minute of contact promotes such formation. Preferably, the treatment need not last longer than six minutes because little improvement is achieved beyond that time. The temperature may be from about 0° C. to about 100° C. because the extraction of these complexes is facilitated at elevated temperature. The treatment procedure can be performed once or can be repeated several times. It is observed that no more than one treatment is normally necessary to achieve the advantages of the present invention.

It is theorized that the improvement in catalyst productivity is achieved in part by the method of the present invention because the olefin washing removes from the titanium halide component aluminum trichloride or complexes of aluminum trichloride with the electron donor or the olefin. This is thought to increase the productivity because the aluminum trichloride has a negative effect thereon because its presence can take the chlorine:aluminum ratio out of the acceptable range. It appears that by removing aluminum trichloride, some of the cationic reactions which cause the formation of oligomers are eliminated.

To achieve the advantages of the present invention, the electron donor must be added to the catalyst component. It is preferred that from about 0.1 to about 2.0 grams of the electron donor per gram of catalyst be added to the catalyst component. If less than 0.1 grams of electron donor per gram of catalyst are used, there will be some improvement in the productivity of the catalyst but, for all practical purposes, at least 0.1 should be used. If more than 2 grams of electron donor per gram of catalyst are used, the catalyst will be deactivated. Preferably, about 0.5 to about 0.9 grams of electron donor per gram of catalyst is added because 0.5 grams are necessary for peak catalyst coating efficiency and if more than 0.9 grams are present, much of the excess is washed away.

The electron donor is added to the catalyst by adding the electron donor to the mixture of the olefin and the catalyst component and, if necessary, a solvent such as heptane. The catalyst component may be allowed to stand in this solution or slurry for as long as 16 hours prior to use in polymerization.

The addition of the electron donor to the catalyst component increases the productivity of the catalyst by activating it without the necessity of expensive time consuming grinding or milling. The olefin washing part of the process is extremely important because the removal of the aluminum chloride and the aluminum chloride-electron donor complex is necessary. Surprisingly, it has been found that the olefin washing and the electron donor addition do not interfere with each other. Thus, a catalyst with improved productivity can be achieved by performing these two operations simultaneously.

After the titanium halide component has been treated according to the present invention, it then can be used as a polymerization catalyst by activating it with an activator such as an aluminum alkyl. Suitable aluminum alkyls are those of the formula

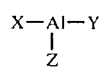

where X and Y are each alkyl of not more than 8 carbon atoms and Z is chlorine or alkyl of not more than 8 carbon atoms.

EXAMPLES

A number of catalyst samples were prepared and used to polymerize propylene under identical conditions. For comparative purposes, two samples of a catalyst prepared by ball-milling aluminum activated titanium trichloride with butyl benzoate (BBE) were used and four different samples of aluminum activated titanium trichloride were used without any modifier. Three of the latter samples were washed with propylene and one was not. None of these were treated with butyl benzoate. The remaining catalyst samples were made by washing aluminum activated titanium trichloride with a mixture of an electron donor in propylene for a period of time ranging from three to 10 minutes. The last two samples in Table 1 had ethyl phenyl acetate (EPA) and ethyl-4-chlorobutyrate (ECB) as the electron donor whereas the others had butyl benzoate.

These catalysts were then used to polymerize propylene in a gas phase reactor at 6.44 atmospheres at a temperature of 80° C. Diethyl aluminum chloride was used as the co-catalyst in all cases and the mole ratio of diethyl aluminum chloride to titanium trichloride in all cases was 7.0/1.0. Ten milliliters of heptane were added during the polymerization to ensure heat transfer and prevent catalyst lumping during the first 10 to 20 minutes of the polymerizations. In all cases, 0.3 grams of catalyst was charged to the reactor. The results are shown in Table 1.

TABLE 1

| Catalyst | C$_3$ Wash | Wash Time (min) | (Wt. Loss) Wt. Gain | Productivity gPP/gTiCl$_3$ hr. atm. | % Heptane Insolubles |
|---|---|---|---|---|---|
| Ball-milled | No | — | — | 37.0 | 97.1 |
| Ball-milled | No | — | — | 42.0 | 96.0 |
| TiCl$_3$.AA | No | — | — | 28.4 | 84.3 |
|  |  |  |  | 32.6 | 80.0 |
| TiCl$_3$.AA | Yes | 5 | (6%) | 31.6 | 86 |
| TiCl$_3$.AA | Yes | 5 | (6%) | 34.0 | 77 |
| TiCl$_3$.AA | Yes | 5 | (6%) | 31.0 | 75 |
| TiCl$_3$.AA | Yes | 3 | 6% | 40 | 89.8 |
| BBE-Mixed w/C$_3$ | Yes | 3 | 6% | 38.5 | 90.3 |
| TiCl$_3$.AA BBE-Mixed w/C$_3$ | Yes | 4 | 26% | 40 | 95.0 |
| TiCl$_3$.AA | Yes | 6 | 6% | 41.0 | 93.8 |
| BBE-Mixed w/C$_3$ | Yes | 6 | 6% | 42.9 | 94.3 |
| TiCl$_3$.AA BBE-Mixed w/C$_3$ | Yes | 10 | 24% | 31.4 | 92.6 |
| TiCl$_3$.AA Heated BBE-Mixed w/C$_3$ | Yes | 6 | 15.7% | 20 | 94.3 |
| TiCl$_3$.AA* | Yes | 2/4 | 13.6% | 50.0/ | 85.8 |
| TiCl$_3$.AA** Washed w/C$_3$ & BBE added after washing | Yes | 5 | 6% | 31.0 37.2 | 93.7 93.8 |
| TiCl$_3$.AA mixed with EPA | Yes | 6 | 15.3% | 37.2 | 80.9 |
| TiCl$_3$.AA mixed | Yes | 6 | 8.7% | 29.4 | 92.7 |

TABLE 1-continued

| Catalyst | C₃ Wash | Wash Time (min) | (Wt. Loss) Wt. Gain | Productivity gPP/gTiCl₃ hr. atm. | % Heptane Insolubles |
|---|---|---|---|---|---|
| with ECB | | | | | |

*In this experiment, the washing was carried out in two steps. First, the catalyst was washed with propylene only for two minutes and then it was washed with a mixture of propylene and butyl benzoate for 4 minutes.

**In this experiment, the catalyst was washed with propylene alone and the butyl benzoate was added after completion of the washing step.

It can be seen by comparing the butyl benzoate experiments which were carried out according to the present invention with the experiments in which ball-milled catalysts were used that polypropylene was produced at substantially equivalent productivities and slightly lower heptane insolubles. Ethyl phenyl acetate increased productivity but not heptane insolubles while ethyl-4-chlorobutyrate did just the opposite. Thus, the process of this invention achieves a catalyst which is much better than TiCl₃.AA and can be comparable to ball-milled catalysts while avoiding the expense and time of ball milling.

I claim:

1. A method for increasing the productivity of an olefin polymerization catalyst containing an aluminum chloride cocrystallized titanium halide which comprises simultaneously washing the modified titanium halide with an olefin and adding electron donor containing an ester group to the catalyst component.

2. The method of claim 1 wherein from about 0.1 to about 2 grams of the electron donor per gram of catalyst is added to the catalyst component.

3. The method of claim 2 wherein from about 0.5 to about 0.9 grams of electron donor per gram of catayst is added to the catalyst.

4. The method of claim 1 wherein the electron donor is selected from the group consisting of alkyl esters of saturated and unsaturated aliphatic and aromatic acids.

5. The method of claim 4 wherein the electron donor is selected from the group consisting of benzoic acid esters.

6. The method of claim 1 wherein the washed catalyst component is suspended in a solvent and the olefin and electron donor are added thereto.

* * * * *